United States Patent
Foerstera et al.

(10) Patent No.: US 6,359,363 B1
(45) Date of Patent: Mar. 19, 2002

(54) COMMUTATOR-SMALL POWER MOTOR

(75) Inventors: Josef Foerstera, Buehlertal; Hartmut Nitzsche, Buehl; Bernhard Merschroth, Ottersweier; Detlef Prahl, Buehl; Michael Hermann, Lauf, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,902

(22) PCT Filed: Apr. 17, 1999

(86) PCT No.: PCT/DE99/01158
§ 371 Date: Mar. 17, 2000
§ 102(e) Date: Mar. 17, 2000

(87) PCT Pub. No.: WO00/07279
PCT Pub. Date: Feb. 10, 2000

(30) Foreign Application Priority Data

Jul. 28, 1998 (DE) .......................................... 198 33 802

(51) Int. Cl.⁷ ............................................. H02K 13/04
(52) U.S. Cl. ........................................ 310/239; 310/242
(58) Field of Search .................................. 310/239, 249, 310/91, 62, 71, 154.01, 218, 242, 254, 40 MM

(56) References Cited

U.S. PATENT DOCUMENTS

| | | | | |
|---|---|---|---|---|
| 3,087,081 A | * | 4/1963 | Apostoleris | 310/239 |
| 3,739,205 A | * | 6/1973 | Winkelmann | 310/42 |
| 3,789,250 A | * | 1/1974 | Macoit et al. | 310/154 |
| 3,875,436 A | * | 4/1975 | MacFarland | 310/43 |
| 4,309,062 A | * | 1/1982 | Bishoff | 384/205 |
| 4,542,314 A | * | 9/1985 | Corbach et al. | 310/154 |
| 4,587,449 A | * | 5/1986 | West | 310/154 |
| 4,589,827 A | * | 5/1986 | Mizoguchi et al. | 417/423.8 |
| 4,667,231 A | * | 5/1987 | Pryor | 348/128 |
| 4,782,261 A | * | 11/1988 | Crevling, Jr. et al. | 310/242 |
| 4,827,173 A | * | 5/1989 | Corbach et al. | 310/218 |
| 4,914,713 A | * | 4/1990 | Mueller et al. | 388/805 |
| 5,019,741 A | * | 5/1991 | Fukui et al. | 310/239 |
| 5,055,728 A | * | 10/1991 | Looper et al. | 310/91 |
| 5,471,107 A | * | 11/1995 | Rawls | 310/249 |
| 5,661,357 A | * | 8/1997 | Iijima | 310/239 |

FOREIGN PATENT DOCUMENTS

| | | | |
|---|---|---|---|
| DE | 42 15 504 A1 | | 11/1993 |
| DE | 196 06 487 A1 | | 8/1997 |
| EP | 0 168 742 | * | 7/1985 |
| EP | 0 550 706 | * | 7/1993 |
| FR | 2 237 603 | * | 2/1975 |
| FR | 2 282 182 | * | 2/1976 |
| FR | 2 402 333 | * | 3/1979 |
| FR | 2 539 930 | * | 7/1984 |
| GB | 1 586 329 | * | 3/1981 |

* cited by examiner

*Primary Examiner*—Joseph Waks
(74) *Attorney, Agent, or Firm*—Michael J. Striker

(57) ABSTRACT

A small commutator motor (1), in particular a blower motor for motor vehicles, has a rotor shaft (2) rotatably mounted in at least one rotor bearing (12) in a motor housing (8, 9). A commutator (18) and an armature winding (21) electrically connected with the commutator (18) are arranged on the rotor shaft (2) so as to be fixed with respect to rotation relative to it. Further, brush guides (11) for receiving brushes (16) held in sliding contact at the commutator (18) and an end shield (10) which fixes the first rotor bearing (12) in place are provided. The end shield (10) and the brush guides (11) are formed as a one-piece structural component part which is a component part of the motor housing (8, 9) as a first motor housing part (8).

14 Claims, 5 Drawing Sheets

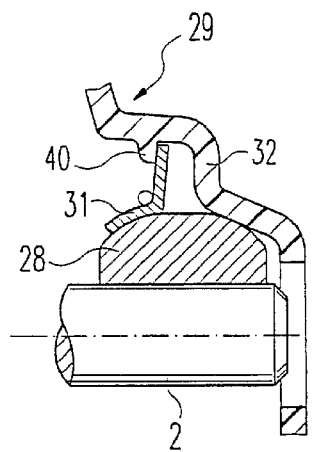
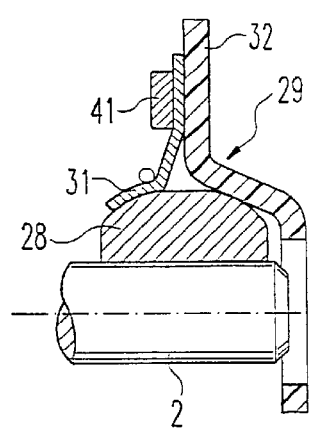
Fig. 2A  Fig. 2B
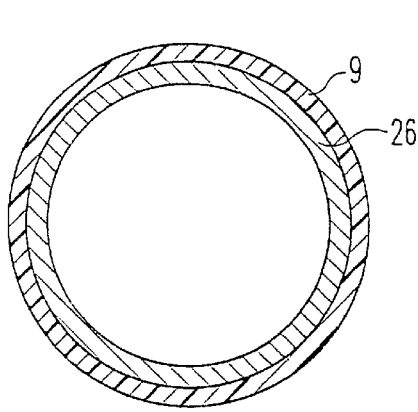
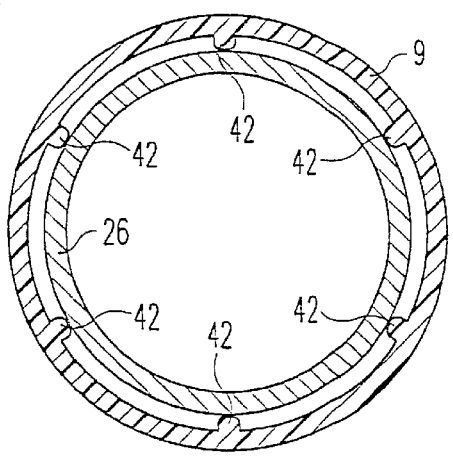
Fig. 3A  Fig. 3B
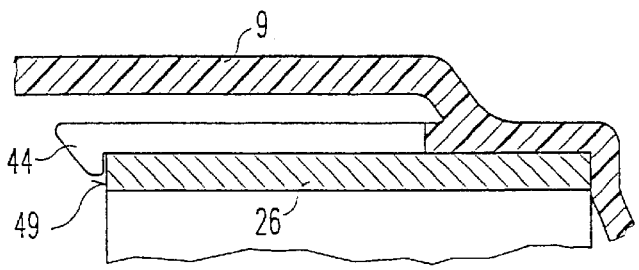
Fig. 4

COMMUTATOR-SMALL POWER MOTOR

BACKGROUND OF THE INVENTION

The invention is directed to a small commutator motor.

A small commutator motor according to the generic part of claim 1 is known from DE 42 15 504 A1. The small commutator motor described in this reference is used in particular as a fan motor for motor vehicles and has a rotor shaft which is rotatably mounted in a motor housing using rotor bearings; a commutator and an armature winding electrically connected to this commutator are arranged on it so as to be fixed with respect to rotation relative to it. Brushes guided in brush guides are held in sliding contact on the commutator. The rotor bearings are realized as ball bearings and each one is fixed to the rotor shaft by an end shield. These end shields are arranged at the end of the motor housing and mounted on a pole ring. The pole ring serves for the magnetic connection of two permanent magnet poles of a stator surrounding the rotor which are inserted in the pole ring. The pole ring is enclosed by a cylindrical housing body. The brush guides are realized as separate structural component parts and mounted on one of the end shields. For pressing the brushes against the commutator, brush contact pressure springs are provided.

This known small commutator motor has the disadvantage that the end shield next to the brush guides and the brush guides are formed as separate structural component parts, thus increasing the expense for assembly. Another disadvantage consists in the fact that the motor housing is formed by the two end shields, the pole ring connecting the two end shields, and the housing body partially surrounding the pole tube, and thus comprises, in all, four parts. Therefore, the expense for assembling the motor housing is also relatively high.

DE 196 06 487 A1 shows another small commutator motor in a modified construction. The small commutator motor known from this reference has a housing receptacle into which the small commutator motor and a fan wheel driven by the small commutator motor can be inserted. At the same time, the housing receptacle is also used for the air conduction of the intake air flowing towards the fan wheel. In this realization, as well, the housing of the small commutator motor used as the drive motor comprises a pole ring, a housing body surrounding the pole ring, and end shields for fixing the rotor bearings in position, each end shield being connected with the pole ring. The brush guides are also realized as separate structural component parts. The expense for assembly that has already been described is therefore also present in this case.

SUMMARY OF THE INVENTION

The small commutator motor according to the invention has the advantage over the prior art that the expenditure on manufacturing and assembly is considerably reduced. Since the end shield situated next to the brush guides is formed as a one-piece structural component part along with the brush guides and is, at the same time, a component part of the motor housing, the result is an extremely compact construction that is easy to assemble. It is no longer necessary to mount the brush guides on the end shield on the one hand and the end shield on the pole ring on the other hand. Rather, the functions of the brush guide, namely, to support of the rotor bearing and housing closure, are integrated in an individual structural component part.

A second end shield provided for a second rotor bearing can advantageously be formed integral with a second motor housing part. In this case, the first motor housing part advantageously closes the second motor housing part like a lid. The two motor housing parts can be produced advantageously as plastic injection molded parts, resulting in low production costs.

The rotor bearings are preferably locked to the associated end shields by ring-shaped holding springs. These holding springs are fixed to the associated motor housing parts, preferably by riveting or by snapping them in position behind projections provided at the respective motor housing part.

It is advantageous for a pole ring connecting at least two poles of permanent magnets with each other to be pressed into the second motor housing part, in which case spacer ribs formed integral with the second motor housing part can be provided between the second motor housing part and the pole ring. Advantageously, these spacer ribs can also be made of an elastomer material; in this case, the second motor housing part can be produced by means of a two-component injection molding process, and the spacer ribs made of an elastomer material can be injection molded onto the second motor housing part. The use of elastomer materials for the spacer ribs results in a particularly low noise emission, since the structure-borne noise emitted by the pole ring is damped extensively.

The axial fixing of the pole ring can be effected either by a stop on the first motor housing part or by special catch hooks forming part of the second motor housing part.

The permanent magnet poles can be fixed advantageously inside the pole ring in that a spring element presses each of the permanent magnet poles against a stop projecting inward at the pole ring. In this manner, possible unavoidable deviations from the correct dimensions resulting from manufacture can be compensated for.

The pole ring is advantageously formed by at least two shells which are separated from one another by gaps running axially relative to the rotor shaft. These shells of the pole ring are substantially more economical and easier to produce than a solid ring. The shells can be made of strip stock using simple tools, for example. The gaps running between the shells have the advantage of suppressing armature cross field.

Advantageously, there can be provided at the second motor housing part an essentially radial flange on which components of control electronics and/or one or more protective resistors can be mounted. In this case, it is particularly advantageous when first metal connections connected to the brushes project radially out of the first motor housing part and second metal connections connected to the components of the control electronics and/or the protective resistors project from the flange of the second motor housing part axially toward the first connections, so that the first and second connections can be connected with one another, for example, by welding, soldering and pressing. The relatively complicated wiring of the control electronics or of the protective resistors to the brushes which has been customary until now is no longer necessary.

If the small commutator motor is driving a fan wheel of a fan, it is advantageous to attach additional blades to the fan wheel in the area of the components of the control electronics or protective resistors for cooling them.

For mounting the fan wheel on the rotor shaft in the motor housing, it is particularly advantageous when the second end shield located opposite to the brush guides has an opening that is closed by a thin membrane or diaphragm. When pressing the fan wheel onto the rotor shaft, the rotor shaft can be supported on the opposite side in that the rotor shaft rests on a suitable counter-piece with the intermediary of the diaphragm. The thin, flexible diaphragm prevents axial forces that occur when the fan wheel is being pressed on from being transferred to the rotor bearing or the motor housing. At the same time, in contrast to an open construction, the flexible diaphragm ensures that the second end shield and the second motor housing part is closed off, so that dirt is prevented from entering the motor housing.

BRIEF DESCRIPTION OF THE DRAWINGS

Embodiment examples of the invention are shown in the drawing in simplified manner and are explained in more detail in the subsequent description.

FIG. 2A shows partial section through a small commutator motor according to the invention in the area of a rotor bearing;

FIG. 2B shows partial section through a small commutator motor according to the invention in the area of a rotor bearing according to an embodiment example modified from FIG. 2A;

FIG. 3A shows a section along line III—III in FIG. 1;

FIG. 3B shows a section along line III—III in FIG. 1 of an embodiment example modified from FIG. 3A;

FIG. 4 shows an axial section through the second motor housing part and a pole ring of a small commutator motor according to the invention;

DESCRIPTION OF THE PREFERRED EMBODIMENTS

Figure 1:
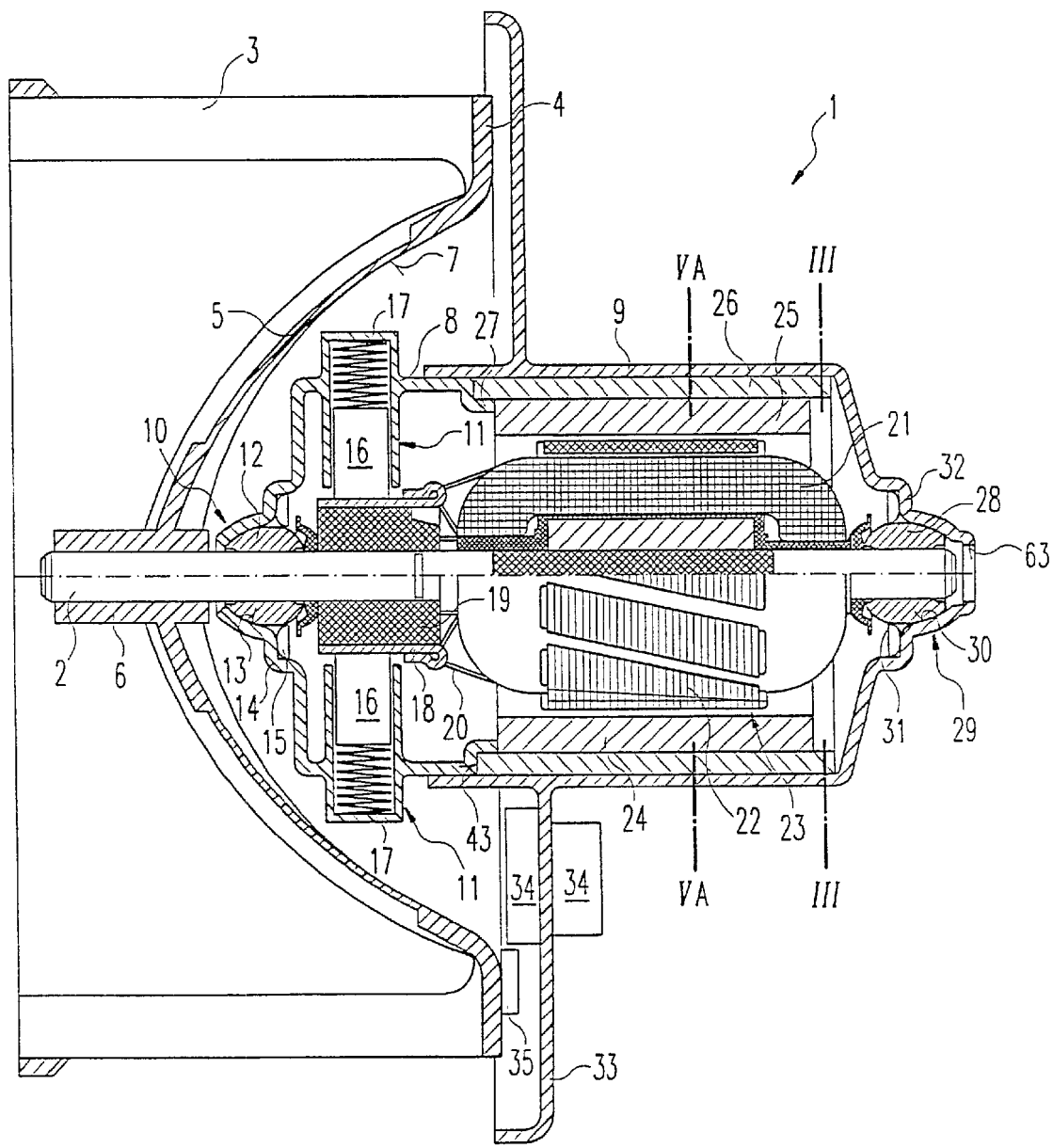
FIG. 1 shows a small commutator motor according to the invention in a sectional view.

FIG. 1 shows a small commutator motor according to a first embodiment example of the invention in a partial sectional view. In the depicted embodiment example, the small commutator motor, designated generally by 1, is used as a blower motor for motor vehicles, for example, for ventilating the radiator or for an air conditioning system. A rotor shaft 2 which is mounted rotatably is therefore connected to a fan wheel 4 in the embodiment example. Fan blades 3 have been formed integral with the curved, pot-shaped base body 5 of the fan wheel 4. The base body 5 of the fan wheel 4 has a sleeve-like connecting element 6 which has been pressed onto the rotor shaft 2 of the small commutator motor 1. The fan wheel 4 can be produced inexpensively as a plastic injection molded part.

Substantially inside a pot-shaped recess 7 in the base body 5 of the fan wheel 4 facing the small commutator motor 1, there is located a first motor housing part 8 which together with a second motor housing part 9 forms a motor housing 8, 9. The first motor housing part 8 and the second motor housing part 9 are connected with one another in that in the embodiment example the first motor housing part 8 is inserted axially into the second motor housing part 9 so as to partially overlap, so that the first motor housing part 8 closing the second motor housing part 9 like a lid. For securing the connection, the two motor housing parts 8 and 9 can be connected with one another by screwing, riveting, gluing, welding or another type of frictional connection. The two motor housing parts 8 and 9 are preferably produced economically as plastic injection molded parts.

According to the invention, the first motor housing part 8 forms, at the same time, a first end shield 10 and brush guides 11 in a one-piece constructional arrangement, i.e., the first end shield 10 and the brush guides 11 are formed as a one-piece structural component part which, as first motor housing part 8, is part of the motor housing 8, 9 at the same time.

A first rotor bearing 12 is fixed in position by the end shield 10. For this purpose, the end shield 12 has a pocket-like recess 13 which surrounds the rotor bearing 12, formed in the embodiment example as a sliding or friction bearing, axially on one side. A holding spring 15 is fastened at a step 14 in the end shield 10 in a manner to be described in more detail and axially surrounds the side of the first rotor bearing 12 remote of the end shield 10.

The brush guides 11, also formed integral with the first motor housing part 8, are used for the radial guiding of brushes 16 which are preferably formed as carbon brushes. The brushes 16 are radially held in contact with a commutator 18 by means of brush contact pressure springs 17. The commutator 18 is fastened, via an insulator 19, to the rotor shaft 2 so as to be fixed with respect to rotation relative to it and is connected via connection lines 20 with an armature winding 21 also arranged on the rotor shaft 2 so as to be fixed with respect to rotation relative to it.

The first motor housing part 8 therefore has three functions in one: it is an end shield for the first rotor bearing 12, it forms brush guides 11 for the brushes 16 and it is, at the same time, part of the motor housing 8, 9. Uniting a number of functions in one structural component part results in an extremely compact construction and an assembly-friendly design. Armature stampings 22 project out of the armature winding 21 which are distanced from permanent magnet poles 24 and 25 by an armature gap 23. The circuit of magnetic flux is closed through an annular pole ring 26 which is preferably pressed into the second motor housing part 9. In order to achieve a radially symmetric armature gap 23, the first motor housing part 8 and therefore the first rotor bearing 12 are preferably centered on the pole ring 26 in that the first motor housing part 8 has a centering projection 27.

On the end of the housing 8, 9 located opposite to the first rotor bearing 12, a second rotor bearing 28 is provided which is also formed as a friction bearing in the embodiment example. For fixing the second rotor bearing 28 in position, the second motor housing part 9 has a second end shield 29 constructed so as to form one piece with it. The second end shield 29 has a pocket-like recess 30 which surrounds half of the second rotor bearing 28 axially. Further, an annular holding spring 31 is fastened to a step 32 in the second end shield 29 and fixes the second rotor bearing 28 axially.

During assembly, the pole ring 26 and the permanent magnet poles 24 and 25 and rotor bearing 28 with the holding spring 31 are initially preassembled on the second motor housing part 9, and then the rotor, comprising the rotor shaft 2, armature winding 21, armature stampings 22 and commutator 18, is inserted into the second motor housing part 9. The rotor bearing 12 with the holding spring 15 is preassembled in motor housing part 9. Finally, the first motor housing part 8 is set on top of it like a lid and pushed in axially in the direction of the second motor housing part 8 until the necessary axial longitudinal play for the rotor bearings 12 and 28 has been set. In this position, the two motor housing parts 8 and 9 are connected with one another, for example, by welding, gluing, riveting or screwing, so that the two end shields 10 and 29 are fixed in position and the axial play is determined in this manner.

The second motor housing part 9 preferably has a flange 33 which extends essentially radially and which at least partially closes the pot-shaped recess 7 of the base body 5 of the fan wheel 4. Components 34 of control electronics and/or protective resistors can be mounted on the flange 33. For the purpose of cooling these components 34 of the control electronics or protective resistors, additional blades 35 are preferably fitted to the fan wheel 4 in the area of these components 34 of the control electronics or protective resistors so that the control electronics or protective resistors can be cooled better.

Details and advantageous further developments and improvements of the embodiment example of a small commutator motor according to the invention shown in FIG. 1 are described with reference to FIGS. 2 to 8.

Different possibilities for attaching the ring-shaped holding spring 31 to the second end shield 29 are shown in FIGS. 2A and 2B. FIGS. 2A and 2B both show a partial sectional view in the area of the second rotor bearing 28. In the embodiment example shown in FIG. 2A, inside projections 40 have been formed on integrally at the step 32 of the end shield 29. The ring-shaped holding spring 31 snaps in behind these projections 40 and is thus locked to the end shield 29. In the embodiment example shown in FIG. 2B, the ring-shaped holding spring 31 is connected with the second end shield 29 are joined by a rivet 41, preferably by ultrasonic riveting. It is also possible for the ring-shaped holding spring 31 to have sharp edges or claws which dig into the relatively soft plastic of the second end shield 29.

Naturally, fastening the holding spring 15 of the first rotor bearing 12 to the first end shield 10 can be effected in the same manner.

FIGS. 3A and 3B show a section along the line III—III in FIG. 1, but without the inserted rotor. The second motor housing part 9 and the pole ring 26 are visible. In both embodiment examples shown in FIGS. 3A and 3B, the pole ring 26 has been pressed into the second motor housing part 9. In the case of the embodiment example shown in FIG. 3A, the pole ring 26 has been pressed directly into the second motor housing part 9 in such a way that the outer surface of the pole ring 26 sits flush on the inner surface of the second motor housing part 9. In the embodiment example shown in FIG. 3B, on the other hand, spacer ribs 42 have been formed integral with the inside of the second motor housing part 9 and are arranged so as to be distributed around the circumference. In this way, the pole ring 26 is kept at a distance from the second motor housing part 9. Correspondingly, the emission of noise is reduced by decoupling structure-borne sound. It is particularly advantageous for the spacer ribs 42 to be made of an elastomer material, for example, rubber. The spacer ribs 42 can then be injection molded onto the second motor housing part 9 in a two-component injection molding process. The elastic design of the spacer ribs 42 further improves the acoustic decoupling between the pole ring 26 and the second motor housing part 9 and thus further reduces noise emission.

A stop 43 shown in FIG. 1 can be used for fixing the pole ring 26 axially in the motor housing 8, 9. Alternatively, in accordance with the embodiment example shown in FIG. 4, it is also possible to provide special catch hooks 44 which are formed integral with the second motor housing part 9 and engage behind a front face 45 facing the first motor housing part 8. The catch hooks 44 can act at the pole ring 9 distributed across the circumference.

Figures 5A, 5B:
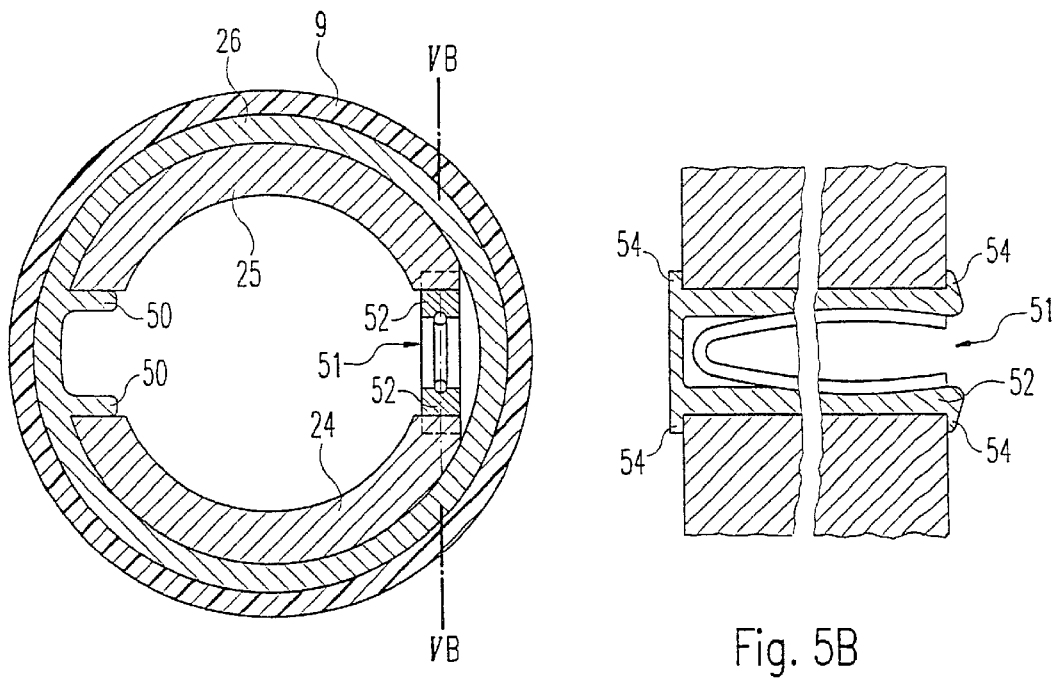
FIG. 5A shows a section along line VA—VA in FIG. 1.
FIG. 5B shows a section along line VB—VB in FIG. 5A.

FIG. 5A shows a section along line VA—VA in FIG. 1, but without the rotor being inserted, so that the armature stampings 22 and the armature winding 21 cannot be seen in FIG. 5A. Shown are the second motor housing part 9, the pole ring 26 and the two permanent magnet poles 24 and 25 of the small commutator motor 1, which is bipolar in the embodiment example.

The pole ring 26 has a stop 50 on one side for holding each permanent magnet pole 24 and 25, one side of the permanent magnet poles 24 and 25 contacting these stops 50. A spring element 51 is used for spreading. The spring element 51 is shown more clearly in FIG. 5B which shows a partial section along line VB—VB in FIG. 5A. In the shown embodiment example, the spring element 51 is formed of a flexible clip 52 that can be spread open with a wire spring 53 inserted in the elastic clip 52. In this manner, the permanent magnet poles 24 and 25 are pressed radially against the pole ring 26 and fixed in position. A protrusion 54 is provided on each side for fixing them axially.

The wire spring 53 and the elastic clip 52 can be produced directly in the production line without any great manufacturing expense. The quantity of individual parts required is relatively small. The clip 52 can also be injection molded directly onto the second motor housing part 9.

Figure 6:
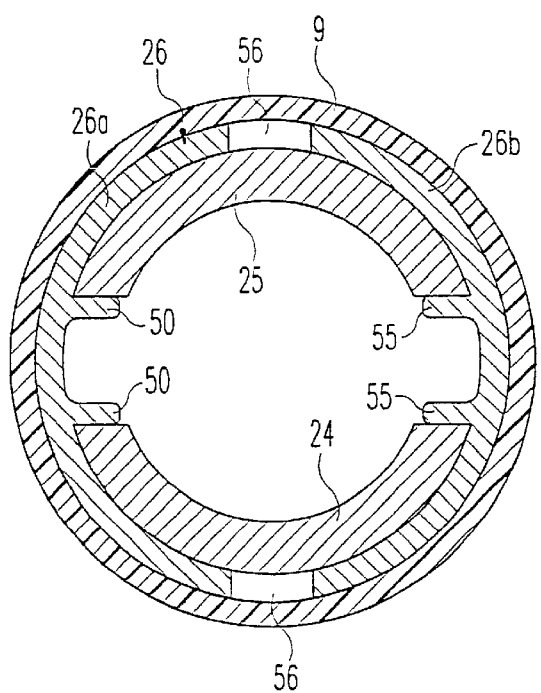
FIG. 6 shows a section along line VA—VA in FIG. 1 of an embodiment example modified from 5A.

FIG. 6 also shows a section along line VA—VA in FIG. 1, but corresponding to a modified embodiment example. In contrast to the embodiment example shown in FIG. 5A, the pole ring 26 is not formed in one piece in tubular shape but, rather, is composed of two shells 26a and 26b. The shells 26a and 26b can be manufactured at considerably lower expense, for example, by pressing them out of strip stock. This can be carried out directly in the production line; prefabrication is not necessary.

An axially extending gap 56 is preferably provided between the two shells 26a and 26b in each instance. By means of these gaps 56, deviations from the correct dimensions resulting from manufacture can be compensated for on the one hand. On the other hand, these gaps 56 serve for the suppression of armature cross field.

Figure 7:
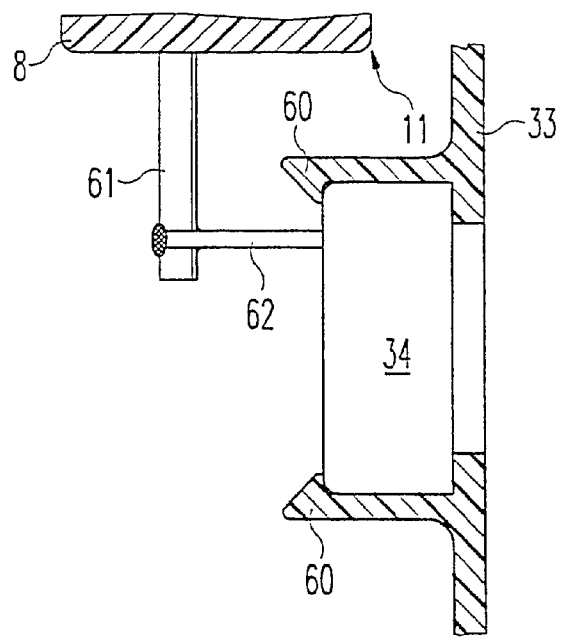
FIG. 7 shows a partial sectional view of a small commutator motor according to the invention to explain the contacting of components of control electronics or a protective resistor.

FIG. 7 shows the flange 33 of the second motor housing part 9 and a component 34 of the electronic control circuit shown by way of example. The electronic control circuit is used, for example, to adjust the speed of the small commutator motor 1. In the embodiment example shown in FIG. 7, the components 34 of the electronic control circuit, for example, resistors or capacitors, are connected with the flange 33 by means of snap-in locking elements 60.

First metal connections 61 project radially out of the brush guides 11 of the first motor housing part 8 and are connected with the associated brush 16 by a movable cord. Second metal connections 62 project away from the flange 33 axially relative to the rotor shaft 2 toward the first connections 61. The first connections 61 of the brush guides 11 can be electrically connected to the second connections 62 of the electronic control circuit in a simple manner, for example, by soldering, welding or pressing. Complicated wiring is not necessary.

Figure 8:
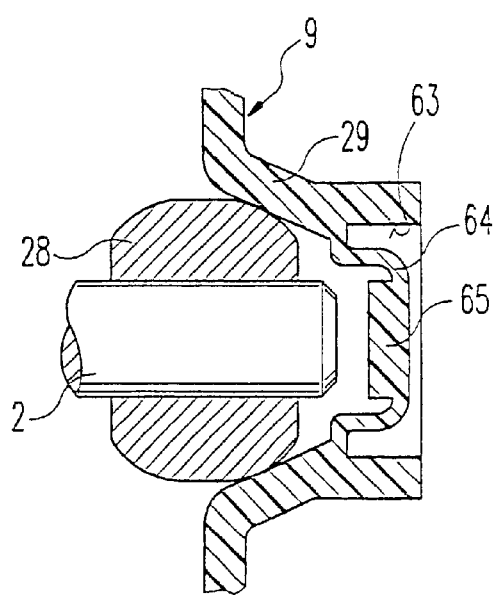
FIG. 8 shows a partial section through a small commutator motor according to the invention in the area of a rotor bearing.

FIG. 8 shows the second end shield 29 at the second motor housing part 9 and the second rotor bearing 28. An opening 63 made in the end shield 29 centric to the rotor shaft 2 is closed by means of a flexible, thin diaphragm 64 which is made thicker in the area of the rotor shaft 2 to form a support or block 65. When the fan wheel 4 is pressed onto the rotor shaft 2, it is necessary to support the opposite end of the rotor shaft 2 so as to prevent the axial forces necessary for pressing it on from being transmitted to the second rotor bearing 28, the second motor housing part 9 and the structural component parts of the rotor and possibly destroying these structural component parts.

In the case of the embodiment example shown in FIG. 1, this support is effected by a counter-piece reaching through the open opening 63. However, this open construction is disadvantageous in that contaminants can enter the motor housing 8, 9. In the embodiment example shown in FIG. 8, the opening 63 is closed by the diaphragm 64. Nevertheless, a counter-piece serving to support the rotor shaft 2 when the fan wheel 4 is being pressed on can act at and support the rotor shaft 2 with the intermediary of the block-like thickened portion 65 of the diaphragm 64. The flexible thin design of the diaphragm 64 prevents an axial transfer of force onto the second end shield 29.

Figure 9:
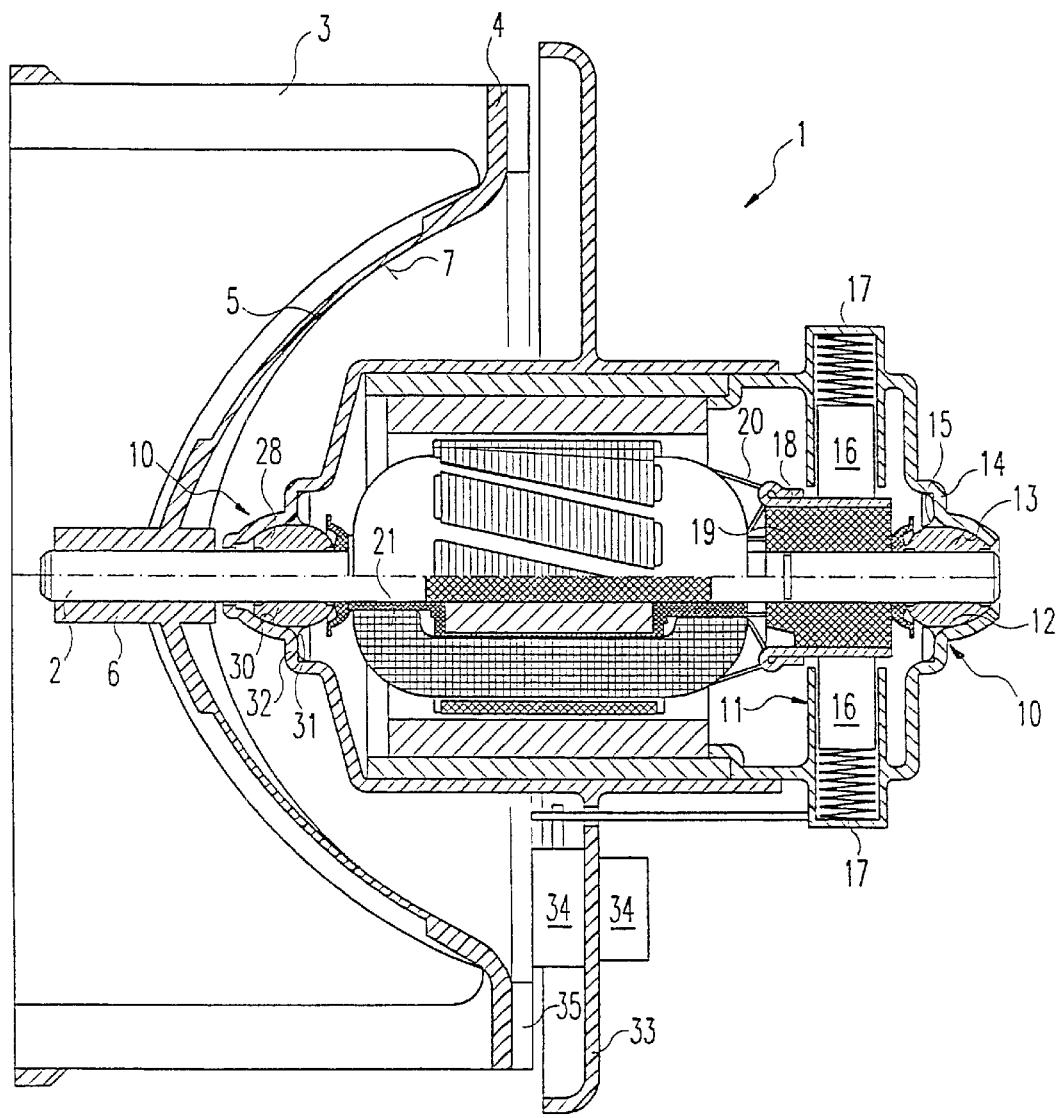
FIG. 9 shows a small commutator motor according to the invention in a sectional view.

The invention is not limited to the embodiment examples shown herein and can also realized with small commutator motors 1 of other constructional types. For example, FIG. 9 shows a small commutator motor 1 in which the commutator 18 is arranged on the side remote of the fan wheel 4. This improves the accessibility of the brushes 16.

What is claimed is:

1. Small commutator motor (1), in particular a blower motor for motor vehicles, with a rotor shaft (2) mounted in at least a first rotor bearing (12) in a motor housing (8, 9), a commutator (18) fixedly arranged on the rotor shaft (2) so as to rotate jointly with the latter, an armature winding (21) arranged on the rotor shaft (2) so as to be fixed with respect to rotation relative to it and electrically connected with the commutator (18), brush guides (11) for receiving brushes (16) held in a sliding contact on the commutator (18), and at least a first end shield (10) which fixes the first rotor bearing (12) in place, the first end shield (10) and the brush guides (11) are formed as a one-piece structural component part which is a component part of the motor housing (8, 9) as a first motor housing (8), and the rotor shaft (2) is additionally mounted in a second rotor bearing (28) which is fixed to a second end shield (29) which is formed integral with a second motor housing part (9), the second motor housing part (9) has an essentially radial flange (33) to which are fitted components (34) of control electronics and/or at least one protective resistor.

2. Small commuter motor according to claim 1, characterized in that the first motor housing part (8) can be connected with the second motor housing part 99) to form a two-piece motor housing (8, 9) in that the first motor housing part (8) closes the second motor housing part (9) in the manner of a lid.

3. Small commutator motor according to claim 1, characterized in that the first motor housing part (8) and/or the second motor housing part (9) are/is formed as a plastic injection molded part.

4. Small commutator motor according to claim 1, characterized in that the first rotor bearing (12) is locked to the first end shield (10) and/or the second rotor bearing (28) is locked to the second end shield (29), in each instance by means of a ring-shaped holding spring (15; 31).

5. Small commutator motor according to claim 4, characterized in that the holding springs (15; 31) are fixed to the associated motor housing part (8; 9) by riveting or by snapping in behind at least one projection (40) provided at the respective motor housing part (8; 9).

6. Small commutator motor according to claim 1, characterized in that a pole ring (26) connecting at least two permanent magnet poles (24, 25) is pressed into the second motor housing part (9).

7. Small commutator motor according to claim 6, characterized in that spacer ribs (42) formed integral with the second motor housing part (9) are provided between the second motor housing part (9) and the pole ring (26).

8. Small commutator motor according to claim 6, characterized in that the pole ring (26) is fixed axially to the first motor housing part (8) by a stop (43).

9. Small commutator motor according to claim 6, characterized in that the pole ring (26) is fixed axially by means of catch hooks (44) formed integral with the second motor housing part (9).

10. Small commutator motor according to claim 6, characterized in that two neighboring permanent magnet poles (24, 25) are fixed in the pole ring (26) and a spring element (51) presses each of the permanent magnet pole (24, 25) against a stop (50) projecting inward at the pole ring (26).

11. Small commutator motor according to claim 6, characterized in that the pole ring (26) is composed of at least two shells (26a, 26b), these shells (26a, 26b) being separated by gaps (56) extending axially relative to the rotor shaft (2).

12. Small commutator motor according to claim 1, characterized in that first metal connections (61) connected with the respective brushes (16) project radially from the first motor housing part (8) and second metal connections (62) connected with the components (34) of the control electronics and/or the protective resistor project axially from the flange (33) of the second motor housing part (9) in direction of the first connections (61), so that the first and second connections (61, 62) can be connected with one another.

13. Small commutator motor according to claim 1, characterized in that the small commutator motor (1) drives a fan wheel (4) and additional blades (35) are fitted to the fan wheel (4) in the area of the components (34) of the control electronics and/or the protective resistor for cooling them.

14. Small commutator motor according to claim 1, characterized in that the second end shield (29) has an opening (63) that closeable by a substantially thin diaphragm (64).

* * * * *